United States Patent [19]

Schultz

[11] Patent Number: 4,739,610

[45] Date of Patent: Apr. 26, 1988

[54] WINDROW LIFTER

[76] Inventor: Lester W. Schultz, R.R. 3, Osakis, Minn. 56360

[21] Appl. No.: 822,063

[22] Filed: Jan. 24, 1986

Related U.S. Application Data

[63] Continuation-in-part of Ser. No. 655,515, Sep. 28, 1984, abandoned.

[51] Int. Cl.[4] .............................................. A01D 43/02
[52] U.S. Cl. ........................................ 56/364; 56/182; 56/192; 56/372
[58] Field of Search ................. 56/16.9, 182, 192, 228, 56/364, 372

[56] References Cited

U.S. PATENT DOCUMENTS

| | | | |
|---|---|---|---|
| 3,059,403 | 10/1962 | Bamford et al. | 56/372 X |
| 3,133,399 | 5/1964 | Van der Lely et al. | 56/372 |
| 3,178,876 | 4/1965 | Lundberg | 56/372 |
| 3,181,290 | 5/1965 | Van der Lely | 56/372 |
| 3,206,920 | 9/1965 | Hofer | 56/364 |
| 3,369,797 | 2/1968 | Cobey | 56/372 |
| 3,613,336 | 10/1971 | Smith | 56/192 X |
| 4,463,546 | 8/1984 | Day | 56/364 |
| 4,471,605 | 9/1984 | Ender, Sr. | 56/372 |

Primary Examiner—Stephen J. Novosad
Assistant Examiner—John F. Letchford

[57] ABSTRACT

An adjustable mechanism for picking up, lifting, and laterally displacing a windrow in a field by the use of a toothed conveyor platform traveling at a canted angle with respect to the center line of the windrow being displayed for drying purposes.

8 Claims, 2 Drawing Sheets

WINDROW LIFTER

This application is a continuation-in-part of U.S. patent application Ser. No. 655,515, filed Sept. 28, 1984 now abandoned.

BACKGROUND OF THE INVENTION

In the past, a number of windrow turners have been invented which produce severe agitation of the windrowed crop and cause substantial quantities of the grain to be knocked off and lost. Since it is necessary to cut and windrow many crops, this has been a serious problem.

SUMMARY OF THE INVENTION

The present invention is specifically designed to engage and lift the windrow onto a conveyor platform which is canted with respect to the direction of travel of the lifter unit along the center line of the windrow so that the windrow will be gently engaged and lifted onto the canted conveyor platform which then moves the windrow laterally on its original center line and drops the same gently onto an area of dry ground for more rapid drying.

DETAILED DESCRIPTION OF THE PREFERRED EMBODIMENT

Figure 1:
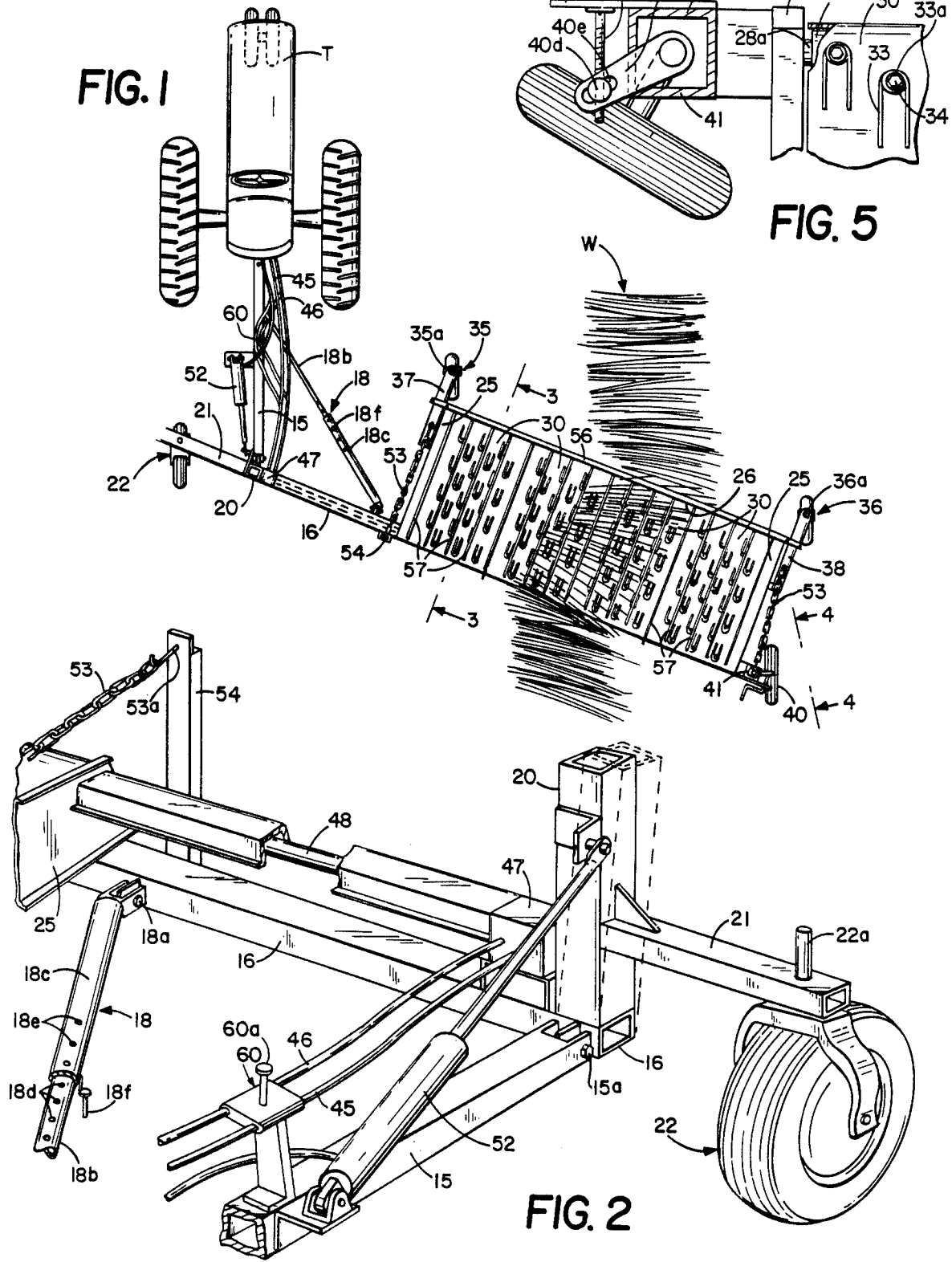
FIG. 1 is a top plan view of the invention attached to a tractor unit.
Figure 2:
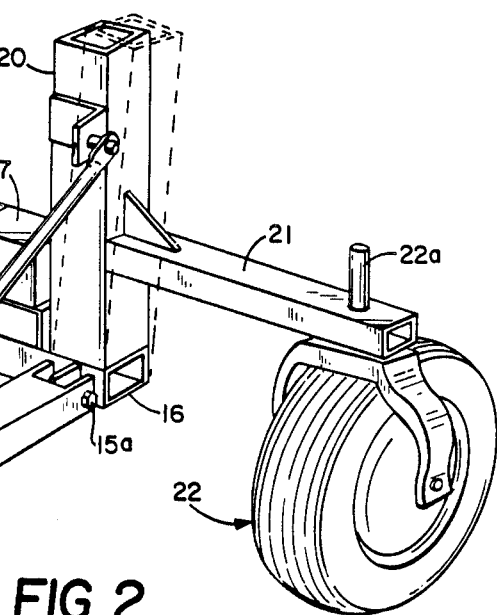
FIG. 2 is a perspective view of the towing and angle adjusting frame mechanism.
Figure 4:
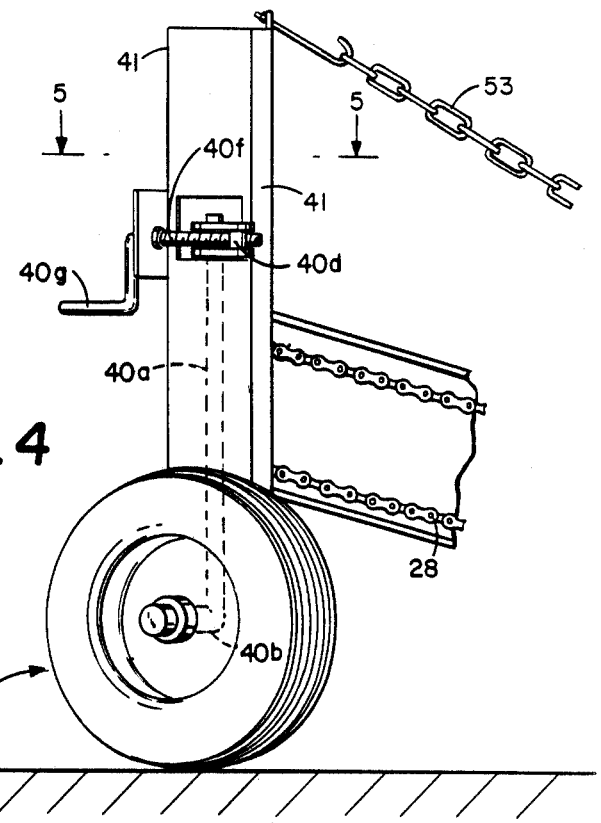
FIG. 4 is a perspective view as viewed from the plane 4—4 of FIG. 1.

FIG. 1 illustrates a conventional farm tractor T. A draw bar 15 is attached to the tractor T in the conventional way and a wheeled supporting frame having a main cross member 16 is provided. The frame cross member 16 is pivotally connected at the rear end of the draw bar 15 as by a connector pin 15a, and an adjustable strut member 18 is mounted on a vertical pivot pin at its forward end to an intermediate portion of the draw bar 15 as illustrated. The rear end of the strut 18 is mounted on a horizontal pivot 18a to an intermediate portion of the frame cross member 16 as best shown in FIGS. 1 and 2. The strut 18 constitutes a pair of telescoping strut elements 18b and 18c and any suitable means for varying the length of the strut 18 may be provided, such as a plurality of the holes 18d and 18e respectively provided in the strut elements 18b and 18c. It will be apparent that the angle between the cross frame member 16 and the longitudinal center line of the tractor T can be adjustably varied by varying the length of the strut 18 which is accomplished by inserting a pin 18f through selectively aligned openings 18d and 18e. An upstanding post member 20 is fixed at its lower end to the cross member 16 and has a laterally-extending frame element 21 fixed thereon with a caster wheel assembly 22 mounted for free rotation on its vertical mounting shaft 22a.

Figure 5:
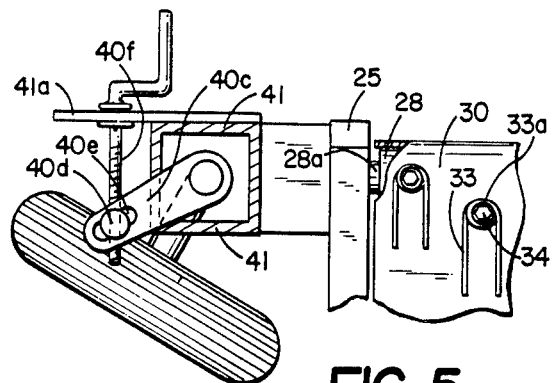
FIG. 5 is a horizontal section taken substantially along the line 5—5 of FIG. 4.

A conveyor supporting frame generally rectangular in shape is fixed to the cross frame member 16 and extends forwardly thereof as best shown in FIG. 1. The rectangular conveyor frame includes a pair of forwardly extending frame elements and a front cross frame member 26, all rigidly interconnected and combining with the cross frame member 16 to provide the required support for the conveyor unit. The toothed belt-type conveyor is mounted for rotation on suitable rollers 28 and 29 respectively having shafts 48 and 29a journaled in the longitudinal frame members 25 and intermediate longitudinal members as may be required (not shown). The conveyor bed is formed by a plurality of conveyor belt units 30 which are trained about the roller elements 28 and 29. A plurality of grain-engaging tines are mounted on the belts 30 in pair units 33 as best shown in FIGS. 1 and 5 having a connecting loop 33a and an attachment bolt 34 attaching each loop to the belt 30.

Figure 3:
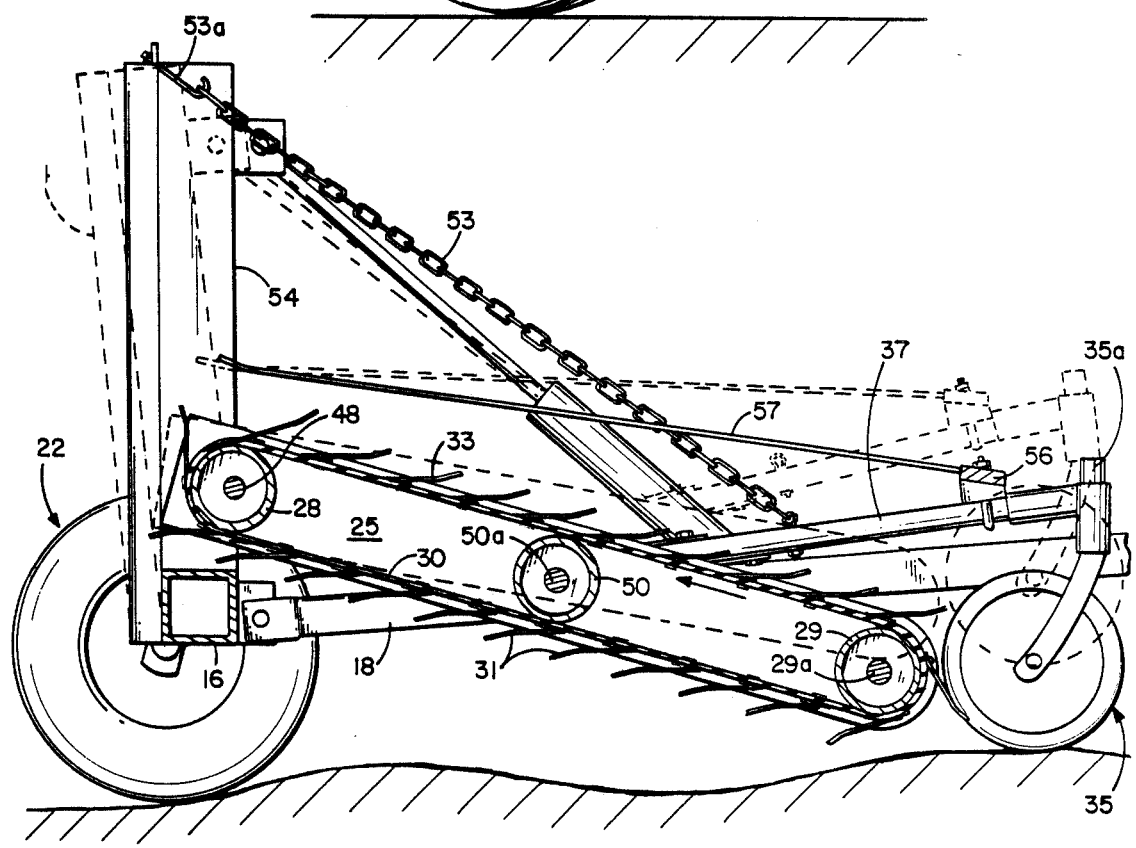
FIG. 3 is a vertical sectional view taken substantially along the line 3—3 of FIG. 1.

A pair of trailing caster wheel assemblies 35 and 36 are mounted for free rotation on their respective vertical shafts 35a and 36a as best shown in FIGS. 1 and 3. The support for the shafts 35a and 36a is respectively provided by a pair of mounting arms 37 and 38 respectively fixed to the two longitudinal conveyor frame members 25. A steering wheel assembly 40 is mounted on the outer end of cross frame member 16 to which an upstanding supporting post 41 is fixed. The wheel assembly 40 is mounted on a vertical shaft 40a having a horizontal spindle element fixed at the lower end thereof. The upper end of the shaft has a steering arm 40c fixed thereto with an internally threaded sleeve member mounted in a slot 40d formed in the free end thereof. A crank shaft 40f is journaled in a suitable bracket 41a in the upper portion of post member 41 and has a crank handle 40g fixed thereto. The threaded portion of the shaft 40f is threadably received in the internally threaded sleeve member 40d and permits adjustment of the angle of the steering wheel 40 with respect to the angular adjustment of the frame structure by adjusting the length of the telescoping strut 18. This positions the wheel in a plane substantially parallel to the direction of travel of the tractor T and the center line of the windrow. The conveyor bed 30 is driven either by a power take-off shaft from the tractor (not shown), or by the tractor hydraulic system through the hydraulic lines 45 and 46 connected with the conventional tractor hydraulic system normally provided with up-to-date tractor units. The hydraulic fluid is delivered to a hydraulic motor 47 which drives a cross shaft 48 mounted above the cross frame member 16 as illustrated. The drive shaft 48 is connected to the forward cross shaft 29a as by the chain 28a meshed with suitable sprockets connected with the shafts 48 and 29a (not shown). An intermediate idler roller 50 mounted on shaft 50a may be provided to support the intermediate portion of the conveyor belts 30.

In the operation of the windrow lifter embodying this invention, the angle of the conveyor bed with respect to the direction of travel of the tractor T and center line of the windrow parallel therewith, is adjusted to produce the desired lateral offset of the windrow to deliver the same onto the dry area of the ground to produce more rapid drying of the windrow without seriously agitating the same. The tines 31 connected with the conveyor initially pick up the grain in the windrow W and gently lift the same onto the conveyor bed which is canted with respect to the direction of travel of the tractor so that the conveyor transfers the windrow laterally a sufficient offset distance to drop the same onto a dry area of the ground for more rapid drying of the windrow. The annular relation of the conveyor bed with respect to the direction of travel of the tractor and the windrow axis determines the amount of lateral offset. This angular relation is adjusted by the strut member 18 and the steering wheel 40, and the four wheels 22, 35, 36, and 40 support the windrow lifter assembly as it travels over the ground.

The front edge of the conveyor bed may be elevated for transporation from one field area to another by means of a hydraulic cylinder 52 mounted on its forward end on a bracket fixed to the draw bar 15 and its rear end to an upper portion of the post 20 as by a suitable bracket fixed to said post. Extension of the hydraulic cylinder 52 tilts the post 20 rearwardly to raise the front caster wheels 35 and 36 upwardly into the dotted position shown in FIG. 3 to facilitate inoperative transportation from on location to another. Suitable means for holding the leading edge of the conveyor bed in elevated position are provided, such as the chains 53 which extend between the respective mounting arms 37 and 38 and the posts 41 and 54 fixed to their respective positions on the rigid supporting frame structure including the cross frame member 16. Suitable hooks 53a are provided on the upper ends of the two posts 41 and 54.

It will be seen that the leading edge of the conveyor bed can also be positioned in the desired relationship to the ground surface by means of the supporting chains 53 so that the windrow can be gently lifted by the tines as they travel upwardly on the leading edge to deliver the windrow gently onto the conveyor bed. A plurality of spring hold-down leaves 56 are fixed at their forward ends to a cross bar 57 which extends across the front of the conveyor bed disposed in spaced relation thereabove. The leaves 56 have a gentle spring tension and serve to hold the windrow stems in engagement with the conveyor bed as the windrow travels rearwardly and laterally on the bed. Since the conveyor bed is canted with respect to the direction of travel of the tractor and the center line of the windrow, the entire windrow will be lifted and moved laterally from its former position in the field onto dry ground for more rapid drying than would be possible without such movement. It is particularly important that the grain be handled gently in order to avoid knocking off the grain from the stalks and the machine is particularly constructed to accomplish this gentle handling.

It has been found that it is necessary to control the speed of the conveyor belt independently of the speed of the tractor in order to obtain maximum efficiency with a minimum of agitation of the windrow. In this connection, a variable hydraulic flow control valve 60 of conventional design is interposed into the hydraulic lines 45 and 46 as best shown in FIG. 2. The control valve 60 has a control knob 60a for varying the flow of fluid to the hydraulic motor 47 which drives the conveyor belt 30. This permits the ratio of the speed of the tractor to the rotation speed of the hydraulic motor 47 to be accurately controlled so that the conveyor belt and tine assembly can pick up the windrow, move it laterally onto dry ground without imparting any substantial longitudinal displacement of the grain to minimize the agitation of the windrow and prevent damaging the fragile grains, while still permitting the same to be dried as quickly as possible.

It will be seen that I have provided a highly efficient windrow lifter particularly canted with respect to its direction of travel to move an entire windrow laterally an adjustable offset distance in order to provide for more rapid drying conditions in the field.

It is to be understood that while there has been illustrated and described certain forms of the present invention, the invention is not to be limited to the specific form or arrangement of parts herein described and shown except to the extent that such limitations are found in the claims.

What is claimed is:

1. A windrow lifter specifically designed to gently lift and laterally displace a windrow of grain with a minimum of agitation of the grain, said lifter comprising, a wheel-supported frame structure, a conveyor bed including a continuous belt mounted for front-to-rear travel on said frame structure and having the elevation of its leading edge adjustable with respect to the ground surface, a plurality of grain-engaging tines mounted on said conveyor belt, a power-driven tractor connected with the wheel supported frame structure for towing the same in a direction parallel to a windrow to be lifted and laterally displaced, power means supplied by said tractor for driving the conveyor bed, speed control means associated with said power means for controlling the driving speed of the conveyor independently of the speed at which the tractor is being driven, means controlled by an operator for moving the wheeled frame structure in a predetermined line of travel generally parallel to the center line of the windrow to be lifted with the leading edge of the conveyor bed aligned with the windrow to engage and lift the same, the direction of travel of the conveyor belt being canted with respect to the center line of said windrow, whereby the windrow lifted onto the top of the conveyor belt surface at the leading edge thereof is transported laterally while supported on the belt surface and is discharged in laterally displaced relation at the trailing edge thereof to move the windrow onto dry ground for more rapid drying conditions, and said conveyor speed control permitting the windrow to be lifted and transported laterally with substantially no longitudinal displacement to produce a minimum of agitation of the windrow during the lifting and lateral movement thereof.

2. The structure set forth in claim 1 and means for adjusting the angle at which the conveyor bed is canted with respect to its direction of travel to controllably vary the amount of offset of the windrow.

3. The structure set forth in claim 2 wherein said adjustment means constitutes a telescopically arranged diagonal member connected with said frame structure to vary said canted relationship.

4. The structure set forth in claim 1 and a plurality of stabilizing leaf elements mounted in spaced relation above the conveyor bed and aligned with the direction of travel of the conveyor bed to hold the windrow down into engagement with the tines of said conveyor bed.

5. The structure set forth in claim 2 and at least one of the wheels supporting said conveyor bed being an adjustable steering wheel to provide for stable adjustment of the canted angle.

6. The structure set forth in claim 1 and adjustment means for the elevation of the leading edge of the conveyor bed constituting a plurality of diagonal supporting elements with an elevated frame structure connected therewith to support the leading edge of the conveyor bed in adjustable relation to the ground surface.

7. The structure set forth in claim 1 and hydraulic means controllable by the operator from the moving means for lifting the leading edge of the conveyor bed to permit quick and easy adjustment of the height of said leading edge both during the operation in the field and also for transporation from one location to another.

8. The structure set forth in claim 1 wherein the conveyor driving means from the tractor constitutes a hydraulic power take-off connection with a manually controllable flow control valve to vary the speed at which the conveyor belt is driven.

\* \* \* \* \*